(12) United States Patent  
Khokhar et al.

(10) Patent No.: US 12,101,320 B2
(45) Date of Patent: Sep. 24, 2024

(54) MANAGING ON-PREMISES AND OFF-PREMISES ACCESS CONTROL

(71) Applicant: Dell Products L.P., Round Rock, TX (US)

(72) Inventors: Muzhar S. Khokhar, Shrewsbury, MA (US); Michael G. Varteresian, Lexington, MA (US); Wenfeng Li, Shanghai (CN); Haijun Zhong, Shanghai (CN); Chen Liang, Shanghai (CN); Donald Mace, Hopkinton, MA (US); Stéphane Meng, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 148 days.

(21) Appl. No.: 17/582,810

(22) Filed: Jan. 24, 2022

(65) Prior Publication Data

US 2023/0239298 A1 Jul. 27, 2023

(51) Int. Cl.
*H04L 9/40* (2022.01)

(52) U.S. Cl.
CPC ............ *H04L 63/10* (2013.01); *H04L 63/102* (2013.01); *H04L 63/20* (2013.01)

(58) Field of Classification Search
CPC ........ H04L 63/10; H04L 63/102; H04L 63/20
See application file for complete search history.

(56) References Cited

U.S. PATENT DOCUMENTS

| 9,531,719 | B1* | 12/2016 | Sutton | ............... H04L 63/083 |
| 9,641,522 | B1* | 5/2017 | Aung | ............... H04L 63/0807 |
| 9,998,499 | B2* | 6/2018 | Mehta | ............... H04L 63/20 |
| 10,235,460 | B2* | 3/2019 | Ago | ............... H04L 63/029 |
| 2012/0250682 | A1* | 10/2012 | Vincent | ............... H04L 45/74 370/392 |
| 2023/0110527 | A1* | 4/2023 | Bhat | ............... H04L 63/102 726/4 |
| 2023/0237181 | A1* | 7/2023 | Varteresian | ......... G06F 21/6218 726/26 |

* cited by examiner

*Primary Examiner* — Mohammad A Siddiqi
(74) *Attorney, Agent, or Firm* — Jackson Walker L.L.P.

(57) ABSTRACT

A disclosed method for managing access control in cloud based environment with on-premises and off-premises access portals includes storing account mapping information, indicative of an association between on-premises accounts off-premises accounts, to a lockbox in each of the plurality of clusters and deploying an off-premises agent in each of the clusters. One or more of the clusters may exist within a hyper-converged infrastructure system. Each off-premises agent may be configured to retrieve cluster access information indicative of access permissions for the on-premises node cluster and upload the cluster access information to an off-premises access control service. The access permissions for the on-premises cluster and the off-premises access permissions may comprise role based access permissions. The off-premises access control service is coupled to an off-premises portal and enables the off-premises portal to switch its access control permissions between on-premises access permissions and off-premises permissions in accordance with the targeted resource.

15 Claims, 2 Drawing Sheets

MANAGING ON-PREMISES AND OFF-PREMISES ACCESS CONTROL

TECHNICAL FIELD

The present disclosure relates to distributed computing and, more specifically, managing on-premises and off-premises access control.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be configured to provide a cloud computing platform, sometimes referred to simply as a cloud or the cloud, that provides on-demand access to virtualized information handling resources, including compute, storage, and network resources, abstracted from a common pool of hardware assets. In at least some contexts, the term private cloud may refer to cloud resources dedicated to or otherwise associated with a single entity, sometimes referred to herein as a customer. Private clouds may be managed internally or by a third party and may be hosted either on-premises or off-premises. In at least some contexts, the term public cloud may refer to a cloud resources maintained by a third party provider and accessible to authorized users via the Internet or another public network as a paid or unpaid subscription. A hybrid cloud, as suggested by its name, may refer to cloud infrastructure that includes both a public cloud and a private cloud, typically linked together with a secure connection.

Controlling access to cloud-based resources is an important consideration in the implementation of any cloud solution. Role based access control (RBAC) refers to an access control methodology in which permission to access a resource may be determined by defining one or more job functions or roles, associating each role with one or more access privileges, and assigning roles to authorized users based on their job functions.

Cloud resources may be accessible from an on-premises portal as well as an off-premises portal, each of which may be associated with its own access control module, potentially resulting in duplicated and/or inconsistent access control efforts and polices. In addition, on-premises cloud platforms are increasingly employing hyper-converged infrastructure (HCI) appliances that support sophisticated configurations including multi-node clusters, each of which may have its own distinct access permissions.

SUMMARY

In accordance with the following description, disclosed methods and systems for managing access control in cloud based environments with on-premises and off-premises access portals includes storing account mapping information, indicative of an association between an on-premises account and an off-premises account, to a lockbox in each of the plurality of on-premises, multi-node clusters and deploying an off-premises agent in each of the clusters. One or more of the clusters may exist within a hyper-converged infrastructure system.

Each off-premises agent may be configured to retrieve cluster access information indicative of access permissions for the on-premises node cluster and upload the cluster access information to an off-premises access control service. In at least some embodiments, the access permissions for the on-premises cluster and the off-premises access permissions comprise role based access permissions. The off-premises access control service is coupled to an off-premises portal and enables the off-premises portal to switch its access control permissions between on-premises access permissions and off-premises permissions in accordance with the resource to be accessed.

When the off-premises portal receives a request to access an on-premises node cluster, the off-premises portal, in conjunction with the access control service, determines whether to grant or deny the request based on access permissions associated with the targeted node cluster. When the off-premises portal receives a request to access off-premises resources, the portal determines whether to grant or deny the request based on the off-premises access permissions.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
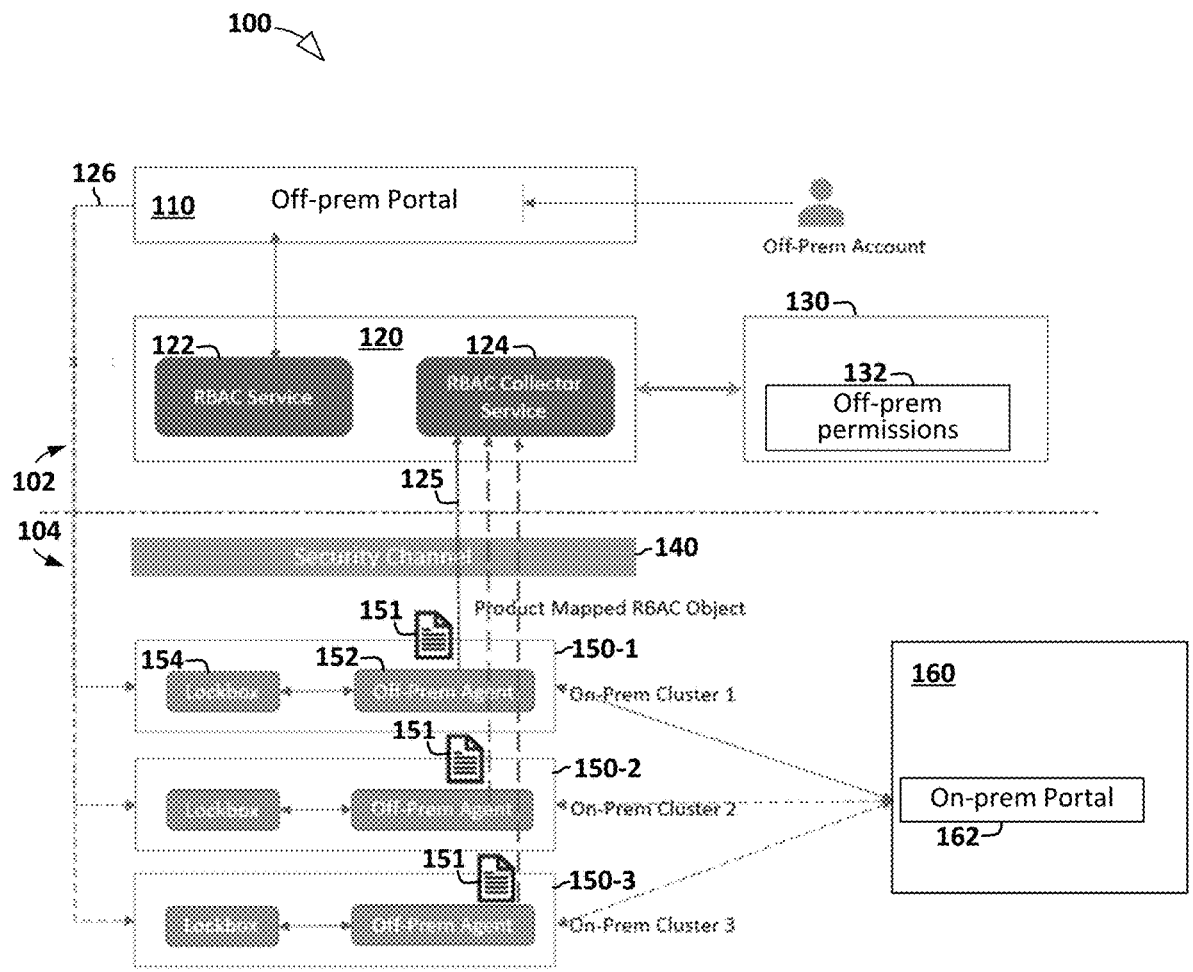
FIG. 1 illustrates a cloud platform in accordance with disclosed teachings.
Figure 2:
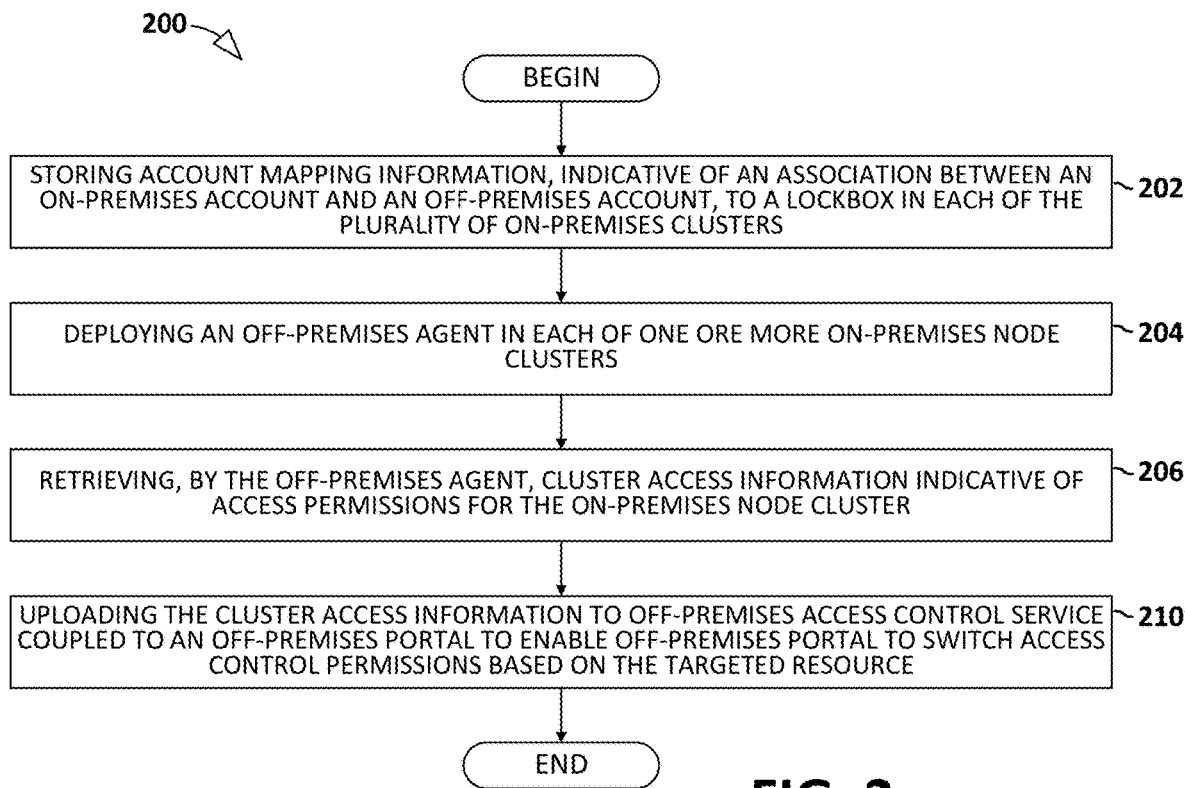
FIG. 2 illustrates a flow diagram of an access control method in accordance with disclosed teachings.
Figure 3:
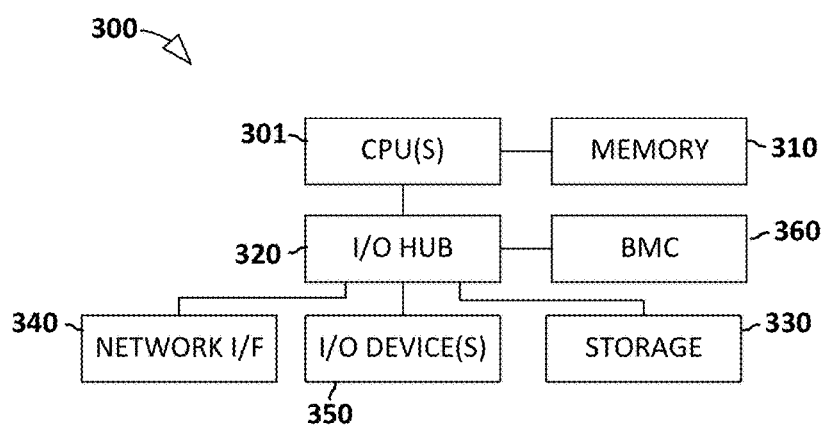
FIG. 3 illustrates an exemplary information handling system.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a cloud platform 100 in accordance with disclosed teachings. The illustrated cloud platform 100 may be characterized as a hybrid cloud that includes public cloud resources referred to herein as off-premises resource 102 and private cloud resources referred to herein as on-premises resources 104. The off-premises resources 102 illustrated in FIG. 1 include an off premises portal 110 coupled to a role based access control (RBAC) module 120. The illustrated RBAC module 120 is coupled to a public cloud database 130 that includes off-premises RBAC configuration information 132 indicating a set of role-based access permissions that may be invoked by off-premises portal 110 to process user requests to access off-premises resources 102.

The on premises resources 104 illustrated in FIG. 1 include one or more on-premises, multi-node clusters 150, three of which are illustrated in FIG. 1 (150-1 through 150-3) managed by an on-premises management resource 160. In at least one embodiment, multi-node clusters 150 may be deployed within one or more hyper converged infrastructure (HCI) components that support virtualized compute, storage, and networking resources. Commercially distributed examples of HCI components suitable for use in the illustrated cloud platform 100 include, without limitation, the VxRail family of HCI appliances from Dell Technologies.

FIG. 1 further illustrates an on-premises management resource 160 for managing all on-premises resources 104. A commercially distributed example of a management resource suitable for use as the management resource 160 illustrated in FIG. 1 include VMware vCenter Server from Dell Technologies. Each cluster 150 illustrated in FIG. 1 includes an off-premises agent 152 coupled to a secure storage resource referred to as lockbox 154. In some embodiments, lockbox 154 can be opened only on the host machine that created it.

In some embodiments, The on premises resources 104 illustrated in FIG. 1 support multi-node clusters. in such embodiment, the customer can specify configuration privilege files indicating permissions for each cluster managed by the on premises management software, The plug-in may be configured to collect runtime, on premises RBAC from each cluster and send it to the off-premises resources 102 by leveraging a secure channel between the public cloud resources and the private cloud resources.

FIG. 1 illustrates mappings 126 mapping an off-premises account and an on-premises account in the lockbox 154 of each cluster 150. In some embodiments, each off-premises agent 152 registers or otherwise acquires on-premises privileges for use with on-premises portal 162. Each off-premises agent 152 retrieves on-premises access permissions information 151 from management resource 160. The collector service 124 in RBAC module 120 may then uploads or otherwise retrieves the on-premises access permissions 151 via a secure channel 125 between on-premises resources and off-premises resources, wherein RBAC service 122 is then suitable configured to switch off-premises portal 110 between off-premises access permissions and the access permissions of each cluster 150.

Referring now to FIG. 2, flow diagram illustrates a method 200 for managing access control permissions in a hybrid cloud environment that includes an off-premises portal and an in-premises portal. The method 200 illustrated in FIG. 2 includes storing (block 202) account mapping information, indicative of an association between an on-premises account and an off-premises account, to a lockbox in each of the plurality of on-premises clusters. An off-premises agent is then deployed (block 204) in each of one or more on-premises node clusters. The off-premises agent then retrieves (block 206) cluster access information indicative of access permissions for the on-premises node cluster. The cluster access information may then be uploaded (block 210) to an off-premises access control service coupled to an off-premises portal to enable the off-premises portal to switch its access control permissions based on which resource is targeted by an access request.

Referring now to FIG. 3, any one or more of the elements illustrated in FIG. 1 and FIG. 2 may be implemented as or within an information handling system exemplified by the information handling system 300 illustrated in FIG. 3. The illustrated information handling system includes one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include a network interface 340, commonly referred to as a NIC (network interface card), storage resources 330, and additional I/O devices, components, or resources 350 including as non-limiting examples, keyboards, mice, displays, printers, speakers, microphones, etc. The illustrated information handling system 300 includes a baseboard management controller (BMC) 360 providing, among other features and services, an out-of-band management resource which may be coupled to a management server (not depicted). In at least some embodiments, BMC 360 may manage information handling system 300 even when information handling system 300 is powered off or powered to a standby state. BMC 360 may include a processor, memory, an out-of-band network interface separate from and physically isolated from an in-band network interface of information handling system 300, and/or other embedded information handling resources. In certain embodiments, BMC 360 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
deploying, in each of a plurality of on-premises node clusters, an off-premises agent, wherein each off-premises agent deployed within an on-premises node cluster is configured to:
retrieve cluster access information indicative of access permissions for the on-premises node cluster; and
upload the cluster access information to an off-premises access control service coupled to an off-premises portal, wherein the off-premises access control service enables the off-premises portal to switch its access control permissions between off-premises access permissions and the access permissions for the on-premises node cluster based on which resource is targeted by an access request; and
responsive to an off-premises request to access an on-premises node cluster, determining whether to grant the off-premises request based on access permissions associated with the on-premises node cluster.

2. The method of claim 1, further comprising:
responsive to an off-premises request to access an off-premises resource, determining whether to grant the off-premises request based on off-premises configuration information indicative of access permissions associated with an off-premises portal for processing requests to access off-premises resources.

3. The method of claim 2, wherein the access permissions for the on-premises cluster comprise role based access permissions.

4. The method of claim 1, further comprising:
storing account mapping information, indicative of an association between an on-premises account and an off-premises account, to a lockbox in each of the plurality of on-premises clusters.

5. The method of claim 1, wherein at least one of the plurality of clusters executes within a hyper-converged infrastructure (HCI) appliance.

6. An information handling system, comprising:
a central processing unit (CPU); and
a computer readable memory including processor executable instructions that, when executed by the CPU, cause the system to perform operations, wherein the operations include:
deploying, in each of a plurality of on-premises node clusters, an off-premises agent, wherein each off-premises agent deployed within an on-premises node cluster is configured to:
retrieve cluster access information indicative of access permissions for the on-premises node cluster; and
upload the cluster access information to an off-premises access control service coupled to an off-premises portal, wherein the off-premises access control service enables the off-premises portal to switch its access control permissions between off-premises access permissions and the access permissions for the on-premises node cluster based on which resource is targeted by an access request; and responsive to an off-premises request to access an on-premises node cluster, determining whether to grant the off-premises request based on access permissions associated with the on-premises node cluster.

7. The information handling system of claim 6, wherein the operations include:

responsive to an off-premises request to access an off-premises resource, determining whether to grant the off-premises request based on off-premises configuration information indicative of access permissions associated with an off-premises portal for processing requests to access off-premises resources.

8. The information handling system of claim 7, wherein the access permissions for the on-premises cluster comprise role based access permissions.

9. The information handling system of claim 6, wherein the operations include:

storing account mapping information, indicative of an association between an on-premises account and an off-premises account, to a lockbox in each of the plurality of on-premises clusters.

10. The information handling system of claim 6, wherein at least one of the plurality of clusters executes within a hyper-converged infrastructure (HCI) appliance.

11. A non-transitory computer readable medium, including processor executable instructions that, when executed by a processor, cause the processor to perform operations including:

deploying, in each of a plurality of on-premises node clusters, an off-premises agent, wherein each off-premises agent deployed within an on-premises node cluster is configured to:

retrieve cluster access information indicative of access permissions for the on-premises node cluster; and upload the cluster access information to an off-premises access control service coupled to an off-premises portal, wherein the off-premises access control service enables the off-premises portal to switch its access control permissions between off-premises access permissions and the access permissions for the on-premises node cluster based on which resource is targeted by an access request; and responsive to an off-premises request to access an on-premises node cluster, determining whether to grant the off-premises request based on access permissions associated with the on-premises node cluster.

12. The non-transitory computer readable medium of claim 11, wherein the operations include:

responsive to an off-premises request to access an off-premises resource, determining whether to grant the off-premises request based on off-premises configuration information indicative of access permissions associated with an off-premises portal for processing requests to access off-premises resources.

13. The non-transitory computer readable medium of claim 12, wherein the access permissions for the on-premises cluster comprise role based access permissions.

14. The non-transitory computer readable medium of claim 11, wherein the operations include:

storing account mapping information, indicative of an association between an on-premises account and an off-premises account, to a lockbox in each of the plurality of on-premises clusters.

15. The non-transitory computer readable medium of claim 11, wherein at least one of the plurality of clusters executes within a hyper-converged infrastructure (HCI) appliance.

* * * * *